United States Patent
O'Connor et al.

(10) Patent No.: US 9,552,053 B2
(45) Date of Patent: *Jan. 24, 2017

(54) METHODS FOR POWER MANAGEMENT IN A COMPUTER SYSTEM WITH MULTIPLE PROCESSING RESOURCES AND MULTIPLE POWER SUPPLIES

(75) Inventors: Clint H. O'Connor, Austin, TX (US); Alfred C. Hartmann, Round Rock, TX (US); Keith R. Abell, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 1025 days.

This patent is subject to a terminal disclaimer.

(21) Appl. No.: 11/948,854

(22) Filed: Nov. 30, 2007

(65) Prior Publication Data

US 2008/0072090 A1  Mar. 20, 2008

Related U.S. Application Data

(63) Continuation of application No. 09/955,683, filed on Sep. 19, 2001, now Pat. No. 7,337,333.

(51) Int. Cl.
G06F 13/00  (2006.01)
G06F 1/32  (2006.01)
G06F 1/26  (2006.01)

(52) U.S. Cl.
CPC .............. *G06F 1/329* (2013.01); *G06F 1/26* (2013.01); *G06F 1/263* (2013.01); *G06F 1/3203* (2013.01);
(Continued)

(58) Field of Classification Search
CPC ...... G06F 1/3203; G06F 1/3287; G06F 1/329; G06F 1/26; G06F 1/263; Y02B 60/1217; Y02B 60/1278; Y02B 60/1282; Y02B 60/144
(Continued)

(56) References Cited

U.S. PATENT DOCUMENTS

| 4,228,496 A | 10/1980 | Katzman et al. ............. 364/200 |
| 4,495,568 A | 1/1985 | Gilbert et al. ................ 364/200 |

(Continued)

FOREIGN PATENT DOCUMENTS

| JP | 6231098 | 8/1994 | ............. G06F 15/16 |
| JP | 9319474 | 12/1997 | ............... G06F 1/26 |
| JP | 9319475 | 7/1998 | ............... G06F 1/26 |

OTHER PUBLICATIONS

Advanced Configuration and Power Interface Specification, Intel, Microsoft, Toshiba. Revision 1.0B, Feb. 2, 1999.

(Continued)

*Primary Examiner* — Robert B Harrell
(74) *Attorney, Agent, or Firm* — Baker Botts L.L.P.

(57) ABSTRACT

A system and method are provided for strategic power supply sequencing in a computer system. The system and method includes a plurality of processing resources that process data and a plurality of power supplies that provide power for the processing resources. A power management engine adjusts the power supplies in response to processing resource changes to optimize power consumption. The power management engine brings online power supplies to meet the demand created by bringing online additional processing resources and brings offline power supplies to meet the decreased demand caused by a decrease in the number of processing resources. Also, the power management engine rotates which power supplies operate to take advantage of more efficient power supplies and to extend the lives of the power supplies. The power management engine also adjusts the power supplies in advance based upon predicted demand levels for the computer system.

18 Claims, 6 Drawing Sheets

(52) U.S. Cl.
CPC .......... *G06F 1/3287* (2013.01); *Y02B 60/1282* (2013.01); *Y02B 60/144* (2013.01)

(58) Field of Classification Search
USPC .................. 713/300, 320, 323, 330, 340
See application file for complete search history.

(56) References Cited

U.S. PATENT DOCUMENTS

| | | | |
|---|---|---|---|
| 4,747,041 A | 5/1988 | Engel et al. .................. | 364/200 |
| 4,851,987 A | 7/1989 | Day ............................. | 364/200 |
| 5,428,790 A | 6/1995 | Harper et al. ................ | 395/750 |
| 5,563,455 A | 10/1996 | Cheng ............................ | 307/41 |
| 5,692,197 A | 11/1997 | Narad et al. .................. | 395/750 |
| 5,781,187 A | 7/1998 | Gephardt et al. ............. | 395/308 |
| 5,784,268 A | 7/1998 | Steffek et al. ................. | 363/55 |
| 5,787,293 A | 7/1998 | Kim et al. ............... | 395/750.01 |
| 5,862,394 A | 1/1999 | Watts et al. ............. | 395/750.07 |
| 5,913,068 A | 6/1999 | Matoba .................... | 395/750.04 |
| 5,918,061 A | 6/1999 | Nikjou .................... | 395/750.06 |
| 5,926,404 A | 7/1999 | Zeller et al. .................. | 364/707 |
| 5,961,613 A * | 10/1999 | DeNicola ........................ | 710/18 |
| 6,028,373 A | 2/2000 | Kim et al. ...................... | 307/31 |
| 6,038,673 A | 3/2000 | Benn et al. ................... | 713/323 |
| 6,092,207 A | 7/2000 | Kolinski et al. ............... | 723/323 |
| 6,141,762 A | 10/2000 | Nicol et al. .................... | 713/300 |
| 6,418,557 B1 * | 7/2002 | Otani ............................ | 725/96 |
| 6,859,882 B2 | 2/2005 | Fung ............................ | 713/300 |
| 2002/0066045 A1 * | 5/2002 | Layton et al. ................. | 713/300 |
| 2003/0023885 A1 * | 1/2003 | Potter et al. ................... | 713/300 |

OTHER PUBLICATIONS

Advanced Configuration and Power Interface Specification, Compaq Computer Corporation, Intel Corporation, Microsoft Corporation, Phoenix Technologies Ltd., Toshiba Corporation. Revision 2.0, Jul. 27, 2000.

Advanced Configuration and Power Interface Specification Revision 2.0 Errata, Compaq Computer Corporation, Intel Corporation, Microsoft Corporation, Phoenix Technologies Ltd., Toshiba Corporation. Errata Document Revision 1.5, Apr. 13, 2001.

Japanese Abstract JP 6231098, Aug. 19, 1994.

Japanese Abstract JP 9319474, Dec. 12, 1997.

Japanese Abstract JP 9319475, Jul. 28, 1998.

U.S. Pending Patent Application entitled "A System and Method for Strategic Power Reduction in a Computer System" filed by O'Connor et al., filed Sep. 19, 2001.

* cited by examiner

FIG. 2a

POWER SUPPLY TABLE (34)

| | PROCESSORS SERVED | INRUSH CURRENT REQ'T ($I_r$) (A) | STEADY STATE CURRENT REQ'T ($I_s$) (A) | RESPONSE TIME ($T_r$) (SEC) | PEAK EFFICIENCY CURRENT (A) |
|---|---|---|---|---|---|
| $PS_1$ | P1, P2, P3, P4 | 18.0 | 8.0 | 2.5 | 6.0 |
| $PS_2$ | P1, P2, P3, P4 | 18.0 | 8.0 | 2.5 | 6.0 |
| $PS_3$ | P1, P2, P3, P4 | 18.0 | 8.0 | 2.5 | 6.0 |
| $PS_4$ | P1, P2, P3, P4 | 18.0 | 8.0 | 2.5 | 6.0 |

FIG. 2b

PROCESSOR (SUBSYSTEM) DEMAND TABLE (36)

| | POWER SUPPLIES | INRUSH CURRENT REQ'T ($I_r$) (A) | STEADY STATE CURRENT REQ'T ($I_s$) (A) |
|---|---|---|---|
| P1 | $PS_1, PS_2, PS_3, PS_4$ | 12.0 | 5.0 |
| P2 | $PS_1, PS_2, PS_3, PS_4$ | 12.0 | 5.0 |
| P3 | $PS_1, PS_2, PS_3, PS_4$ | 12.0 | 5.0 |
| P4 | $PS_1, PS_2, PS_3, PS_4$ | 12.0 | 5.0 |

METHODS FOR POWER MANAGEMENT IN A COMPUTER SYSTEM WITH MULTIPLE PROCESSING RESOURCES AND MULTIPLE POWER SUPPLIES

RELATED APPLICATION

This application is a Continuation of U.S. patent application Ser. No. 09/955,683 filed Sep. 19, 2001 now U.S. Pat. No. 7,337,333, which is related to U.S. patent application Ser. No. 09/955,684 filed Sep. 19, 2001. The contents of these applications are incorporated herein in their entirety by this reference.

TECHNICAL FIELD

This disclosure relates in general to the field of computer power consumption, and more particularly to a system and method for strategic power supply sequencing in a computer system.

BACKGROUND

Computer systems, including servers and storage subsystems, use significant amounts of power. In the past, conserving power has always been secondary to speed and processor availability. However, Internet sites with excess capacity for high peak periods such as an Olympics website or an online stock trading website waste power keeping the computer systems ready for the next peak period. In addition, power problems and rolling blackouts, such as those experienced in California in 2000-2001 during deregulation, have begun to spur awareness that power conservation may be required in order to keep a network center operational. In addition, as microprocessors continue to scale up in speed and density, corresponding power consumption may increase dramatically requiring more efficient power management.

Because of the increased processing demands required by today's software and Internet sites, more computer systems utilize multi-processor systems which require more power to operate than single processor computer systems. In addition, the multi-processor computer systems generally have multiple power supplies to power the multi-processors and provide redundancy features. In multi-processor technology, multi-processor specifications often describe how to start and stop processors in multi-processor servers. The multi-processor specifications select a boot processor and then add application processors as discovered, so that a multi-processor server is dynamically configured without a fixed foreknowledge of the number of processors in the server. But the multi-processor and the Advanced Configuration and Power Interface ("ACPI") specifications do not typically allow for any power consumption control or savings from a source or decision engine external to the server unit in which the multiple processors reside nor do the specifications typically provide for strategic control over the multiple power supplies.

With the advent of power hungry processors and multi-processor computer systems, power management has become more important. In addition, powering up and down the multi-processors imposes inrush loads and efficiency changes in the power supplies. For instance, power supplies may fail during startup, when inrush currents stress the power supply components. Therefore, the power supplies must be able to manage the inrush load without failing and yet efficiently supply a steady state current to the multi-processors and other computer components. The power supplies also must continue to provide appropriate redundancy for the computer system while optimizing power consumption. Power supply management, sequencing, and conservation requires meeting not only inrush and steady state load demands but also policy based redundancy and efficiency requirements. Demand triggered power supplies have attempted to reduce power consumption by starting up additional power supplies based upon the load on the computer system but they do not generally account for inrush supply, choose the most efficient power supply to start from a pool of available power supplies, or provide for enterprise wide power conservation.

SUMMARY

Therefore, a need has arisen for a system and method that allows for enterprise wide power supply sequencing and management.

A further need has arisen for a system and method that allows for selection of power supplies out of a pool of available power supplies based upon the capacity of the power supplies to deliver inrush and steady state current to achieve redundancy and efficiency goals.

A further need has arisen for a system and method that allows for power reduction based upon the power demands and processing demands of the system.

A further need has arisen for a system and method that allows for strategies for power consumption and power reduction.

In accordance with teachings of the present disclosure, a system and method are described for strategic power supply sequencing in a computer system which substantially eliminates or reduces disadvantages and problems associated with previous systems and methods. The system and method allows strategic enterprise level power supply sequencing and management and power conservation based on processing resource and power supply characteristics and power and processing demands for computer systems having multiple power supplies.

In accordance with one aspect of the present disclosure, a system and method provides strategic enterprise level power supply sequencing for a computer system having a plurality of processing resources operable to process data. The computer system may also include a plurality of power supplies operable to provide power to the processing resources and desired redundancy features. A power management engine, associated with the power supplies, preferably adjusts the number of power supplies operating in relation to the number of processing resources operating, the processing and power demands made on the computer system, and power supply redundancy and efficiency requirements.

In one embodiment, a resource management engine, associated with the processing resources, detects the demand on the computer system. With the demand determined, the resource management engine decides if a processing resource change is needed to meet the current demand. If a processing resource change is required, the power management engine determines if the power supplies need to be adjusted to provide optimum power for the processing resource change and the demand on the computer system. If the processing resource change requires additional processing resources to be turned on, the power management engine decides if additional power supplies are needed to power the additional processing resources and still satisfy redundancy and efficiency requirements. If the processing resource change optionally requires that currently operating processing resources be turned off, the power management engine determines if currently operating power supplies need to be turned off to optimize power consumption and still maintain redundancy and efficiency requirements. In either situation, the power management engine may also rotate which power supplies operate to level the usage of the power supplies and provide for longer lives for the power supplies. In addition, the power management engine may schedule the power off of unneeded power supplies after a set time of delay of inactivity to filter out short term variation and thereby prevent undue wear on the power supplies caused by frequently switching the power supplies on and off.

In an alternative embodiment of the present disclosure, the system and method allows for forecasting or predicting demand and adjusting the power supplies in accordance. The resource management engine stores historical demand data and predicts demand by using the historical demand data. By predicting demand, the resource management engine may scale the appropriate number of processing resources in advance to adequately satisfy future demand requirements. Adjusting the processing resources in advance allows the power management engine to also adjust the power supplies in advance of the predicted demand and therefore the processing resources will have sufficient power in advance and power consumption will be optimized. If the demand does not materialize, then at some time interval past the expected demand, the resource management engine may decide to scale back and may further decide to adjust the historical data accordingly.

The present disclosure provides a number of important technical advantages. One important technical advantage is ability to provide enterprise wide power supply sequencing and management. Power management and power optimization may be handled across a single computer system or multiple computer systems. For example, the power management engine can manage the power consumption across a plurality of racks of servers where each server is a multi-processor server having multiple power supplies. The power supplies in one server may operate to provide power to the processing resources in another server through the power management engine. This provides for a strategic advantage in that multiple computer systems can be managed as one and enterprise level resource availability and power management can be achieved and managed intelligently.

Another important technical advantage of the present disclosure is that the power supplies are selected out of a pool of available power supplies based upon the capacity of the power supplies to deliver inrush and steady state current and operate near peak efficiency to achieve optimization, redundancy, and efficiency goals. Only the minimum number of power supplies, and not all of the power supplies, are operational at any given time. Therefore, power is not wasted in power supplies that are not currently needed to meet the current demand requirements and power consumption is optimized.

Another important technical advantage of the present disclosure is that power consumption and power optimization may be based on computational processing demands of the computer system and not simply upon electrical loads on the computer system. Basing power consumption on processing demand as well as electrical load allows the computer system to more quickly and adequately respond to workload changes and not have to wait until the power supplies are overburdened with load to make a change.

Another important technical advantage of the present disclosure is that it allows for strategies for optimizing power consumption and power reduction. The present disclosure specifically addresses optimum power consumption and optimization as a goal or strategy. This is achieved by extending decisions beyond local processor architecture or multiple power supply computer system architecture. This present disclosure allows local and global power management strategies to reduce power consumption and still maintain processing and power capacity across a single computer system or multiple computer systems. In addition, the ability to predict demand allows for additional strategies in optimizing power consumption.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2a depicts an example of a supply table;

FIG. 2b illustrates an example of a demand table;

DETAILED DESCRIPTION

Preferred embodiments and their advantages are best understood by reference to FIGS. 1 through 6, wherein like numbers are used to indicate like and corresponding parts.

Under previous systems and methods for strategic power supply sequencing in computer systems, the power management has generally been locally bound for a single computer system based on load requirements and does not typically allow for power reduction and management at the enterprise level. For example, a power supply switch may monitor voltage and current levels and automatically switch on a power supply when the levels drop below a fixed minimum or upon receipt of a power fail signal from another power supply. The present disclosure allows power optimization and management and power supply sequencing across one or more computer systems based upon the characteristics of the processing resources and power supplies, power consumption strategies, redundancy and efficiency requirements, and demands on the computer systems. This allows for leveraging of power supplies across multiple computer systems.

Figure 1:
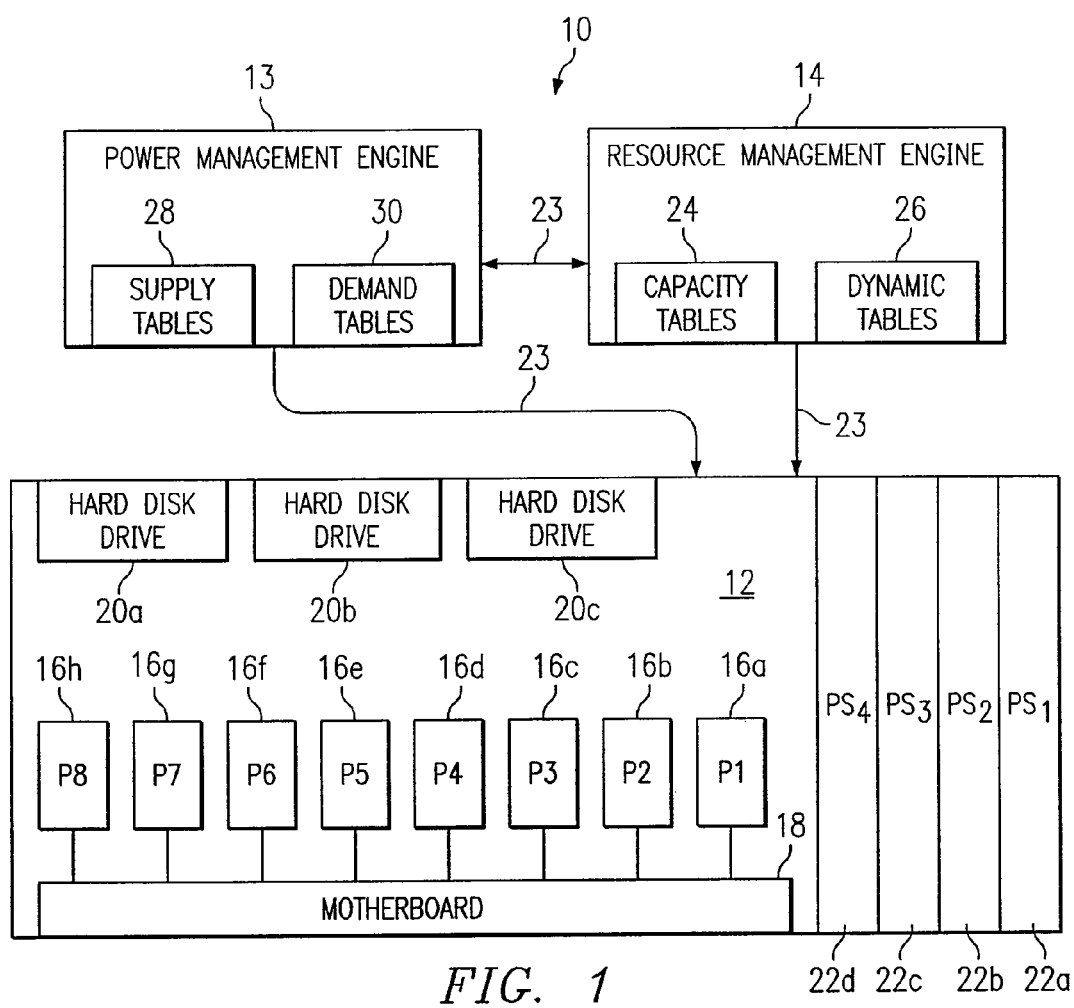
FIG. 1 illustrates a block diagram of a system employing strategic power supply sequencing.

FIG. 1 illustrates a block diagram of system 10 employing strategic power supply sequencing. System 10 includes server 12, power management engine 13, and resource management engine 14.

As shown in the embodiment of FIG. 1, server 12 may be an 8-way server having eight different processors 16, all coupled to motherboard 18. Processors 16 occupy space on motherboard 18 or in alternative embodiments may reside on multiple processor cards, complete with local resources such as caches, memory, and supporting chipsets, that plug into a standard backplane which uses a shared power bus. In alternative embodiments, server 12 may have more than eight processors or less than eight processors.

Processors 16 may be IBM compatible mobile processors, such as are available through Intel and Advanced Micro Devices. Processors 16 may be mobile processors, such as those generally used in laptop computers, instead of the processors generally used in desktop computers or servers because mobile processors often have lower power states in addition to just on and off states like a typical desktop computer or server processor. Using mobile processors instead of desktop computer or server processors allows for strategic power reduction in server 12 because processors 16 may be powered to a lower power state to save energy. In addition, using mobile processors and chipsets in multi-processor servers increases server density within a server rack by reducing power consumption per server, and allows for the opportunity to utilize local and global power management strategies to reduce power consumption and still maintain server capacity. Also, processors 16 may be configured as symmetrical or asymmetrical processors.

In addition to processors 16, server 12 also contains hard disk drives 20. Server 12 in FIG. 1 contains three hard disk drives 20 but in alternative embodiments, server 12 may have more than three or less than three hard disk drives 20. Hard disk drives 20 store data for server 12 and may be SCSI, EIDE, or any other appropriate hard disk drive type.

Associated with server 12 and processors 16 are four power supplies 22. In alternative embodiments, server 12 may contain more than four or less than four power supplies 22. Power supplies 22 are of the appropriate power rating to provide load-balancing. Power supplies 22 may be designed to use local on-card regulation or also provide power on a shared bus beyond the requirement of the on-card resources. In previous systems and methods, more than one power supply 22 was generally only provided for redundancy. For instance, power supplies 22a, 22b, and 22c would typically supply all of the needed power to operate all eight processors 16, all three hard disk drives 20, and any other components within server 12 requiring power. Therefore, power supply 22d was present only for redundancy and back-up purposes and would generally be online in case there was a problem with power supply 22a, 22b, or 22c, since there would not be time to bring power supply 22d on-line. So if power supply 22a went offline or had a malfunction, power supply 22d would already be online and operate in place of power supply 22a.

In the present disclosure, in addition to providing redundancy features, the multiple power supplies 22 also allow for strategic power supply sequencing and strategic power optimization in server 12. In addition, system 10 goes beyond simple redundancy to address the fact that processors 16 within server 12 may be powered down and consequently require even less power supply redundancy.

System 10 allows for strategic power reduction in server 12 through the operation of resource management engine 14. As shown in FIG. 1, resource management engine 14 may be located external to server 12. But in alternative embodiments, resource management engine 14 may be internal to server 12 as a separate unit or stored across hard disk drives 20 and processors 16. When resource management engine 14 is external to server 12, resource management engine 14 communicates with server 12 through communication channel 23 which may be an Ethernet connection or any other appropriate communication network.

Resource management engine 14 provides power reduction and power conservation by determining and controlling which processors 16, hard disk drives 20, and power supplies 22 function within server 12 based upon the demand on server 12. To help in the power reduction, resource management engine 14 stores information in capacity tables 24 and dynamic tables 26. Capacity tables 24 store such information as processor startup and shutdown times, power supply capacities, and performance statistics for the processors and power supplies such as MHz/watt, transactions per minute per sec ("tpmC/sec"), and transactions per minute per watt ("tpmC/watt"). Dynamic tables 26 store historical information to aid in resource management engine 14 forecasting or predicting future demands on server 12. Dynamic tables 26 store, for example, historical demand data from other time periods relating to typical time of day loading, day of week loading, holiday loading, other special and normal event loadings, and knowledge of power grid performance from a power distribution system. In alternate embodiments, dynamic tables 26 store equations instead of data where the equations calculate the future demand taking into account the time of day and the supply information of server 12. In the embodiment shown in FIG. 1, capacity tables 24 and dynamic tables 26 may be located within resource management engine 14. But in other embodiments, capacity tables 24 and dynamic tables 26 are stored across hard disk drives 20 in server 12. To provide redundancy and allow continued operation if resource management engine 14 malfunctions, the information stored in capacity tables 24 and dynamic tables 26 can be stored in both resource management engine 14 and hard disk drives 20.

In order to conserve and reduce power consumption, resource management engine 14 scales processors 16 in response to power and processing demands made upon server 12. Resource management engine 14 scales processors 16 by turning processors 16 on, off, or to a lower power state depending on the demand on server 12. Each processor 16 includes power management hardware coupled to it that allows resource management engine 14 to dynamically operate each processor 16 by turning it on, off, or to a lower power state without disrupting or restarting other currently operating processors 16. In addition, resource management engine 14 may scale processors 16 so that the scaling is invisible to a user and the operating system.

For one embodiment, regardless of demand, processor 16a will always be turned on to provide overhead processing needs such as motherboard and bus requirements. Using information stored in capacity tables 24 regarding processors 16 and power supplies 22, resource management engine 14 determines when additional processors 16 should be brought online, offline, or reduced to a lower power state to efficiently satisfy the demand on server 12. For example, processor 16b may be turned on as the base level at 8:00 AM when a typical work day begins where processor 16a provides overhead processing needs. As the work day progresses, the demand on server 12 generally increases. Resource management engine 14 tracks the demand on server 12 and at 10:00 AM when demand reaches a certain predetermined level, resource management engine 14 may turn on processor 16c to accommodate the increased demand. At 11:00 AM, demand greatly increases so that resource management engine 14 brings online processors 16d and 16e to handle the demand on server 12. At noon, demand on server 12 drops so that resource management engine 14 turns off processor 16e and reduces processor 16d to a lower power state. At 1:00 PM, demand may increase and resource management engine 14 returns processor 16d to a full power state. At 2:00 PM, demand spikes and resource management engine 14 turns on processors 16e, 16f, and 16g to handle the demand on server 12. This demand level continues until 5:00 PM when demand may begin to decrease and resource management engine 14 begins to turn off or reduce lower power states of processors 16 until only processor 16a is operational to provide overhead processing needs.

The above example shows how system 10 conserves and reduces power consumption. From 8:00 AM to 10:00 AM, processor 16a and processor 16b are turned on. In previous multi-processors servers, processor 16c, if not all the remaining processors 16, are generally brought online at 8:00 AM and remain online until the end of the work day. But in system 10, power is saved by turning on, off, and reducing to lower power states processors 16. Therefore, processor 16c is offline from 8:00 AM until 10:00 AM which results in a power savings of two hours for processor 16c. Processor 16d is offline until 11:00 AM and is in a lower power state for one hour. There is a power savings of four hours for processor 16d. Processor 16e does not come online until 11:00 AM, goes offline at noon, and comes back online at 2:00 PM which results in a power savings of five hours. Processors 16f and 16g are not brought online until 2:00 PM which results in a power savings of six hours for each of processor 16f and 16g. In addition to providing power reduction and conservation, the operating life of processors 16 also increases because processors 16 are not constantly operational. The operation of system 10 occurs seamlessly and is transparent to users of server 12 so that the users think that all eight processors 16 are always functioning.

System 10 allows for strategic power supply sequencing in server 12 through the operation of power management engine 13. As shown in FIG. 1, power management engine 13 may be located external to server 12. But in alternative embodiments, power management engine 13 may be internal to server 12 as a separate unit, stored across hard disk drives 20 and processors 16, or located externally with resource management engine 14. When power management engine 13 is external to server 12, power management engine 13 communicates with server 12 through communication channel 23.

Power management engine 13 provides strategic power supply sequencing and power conservation based upon the demand on server 12 and the processor changes determined by resource management engine 14 by determining and controlling which power supplies 22 will operate and provide power to processors 16 and hard disk drives 20 within server 12. To help in power supply sequencing, power management engine 13 stores information in supply tables 28 and demand tables 30. Supply tables 28 store information regarding the supply side of power supplies 22 including inrush current delivery, steady state current capacity, relative power efficiency, load data, peak efficiency current, and power supply response times as well as other data such as hierarchical power supply bus data and alternative power supply sources such uninterrupted power supplies ("UPS") and generators. Demand tables 30 store information regarding the demand side of processors 16 such as inrush current requirements and steady state draw current requirements.

In the embodiment shown in FIG. 1, supply tables 28 and demand tables 30 are located within power management engine 13. But in other embodiments, supply tables 28 and demand tables 30 may be stored across hard disk drives 20 in server 12. To provide redundancy and allow continued operation if power management engine 13 malfunctions, the information stored in supply tables 28 and demand tables 30 can be stored in both power management engine 13 and hard disk drives 20.

In order to strategically sequence power supplies and optimize power consumption, power management engine 13 adjusts power supplies 22 in response to processor 16 changes effected by resource management engine 14. Power management engine 13 adjusts power supplies 22 by turning power supplies 22 on or off or rotating which power supplies 22 are operational depending on the processor 16 change required by the demand on server 12. Power management engine 13 rotates which power supplies 22 are operational so that power supplies 22 are not left unused for long periods of time when there are more power supplies 22 than are needed by server 12. In addition, power management engine 13 may adjust power supplies 22 so that the adjusting is invisible to a user and the operating system.

For one embodiment, powers supplies 22a, 22b, 22c, and 22d may be identical power supplies having identical characteristics as shown in power supply table 34 in FIG. 2a. Processors 16a, 16b, 16c, and 16d may be identical processors having the characteristics shown in processor demand table 36 in FIG. 2b. Even though power supplies 22 and processors 16 exhibit identical characteristics, it is not necessary for strategic power supply sequencing that power supplies 22 and processors 16 provide identical capabilities.

Power supply table 34 includes five columns of data for each of the four power supplies 22. Power supply table 34 includes only four of the eight powers supplies 22 for discussion purposes. Column 38 lists processors 16 that a particular power supply 22 is capable of providing power to. Column 40 lists the maximum inrush delivery current requirement that each power supply 22 can deliver to processors 16. Column 42 lists the maximum steady state current requirement that each power supply 22 can provide to processors 16. Column 44 lists the response time or the time it takes for each power supply 22 to come online and provide steady state current. Finally, column 46 lists the peak efficiency current for each power supply 22. The peak efficiency current is the level of current provided by power supplies 22 where power supplies 22 are operating at their highest efficiency.

Processor demand table 36 includes three columns of data for processors 16a, 16b, 16c, and 16d. Column 48 lists power supplies 22 which can provide power to each processor 16. Column 50 lists the inrush current requirement for each processor 16. The inrush current requirement is the amount of inrush current needed to initially power up a particular processor 16. Finally, column 52 lists the steady state current requirement for each processor 16 which is the amount of steady state current needed to operate processors 16 after the initial power up.

Further, redundancy in power supplies 22 is required to ensure that enough power remains to serve system 10 and all components within system 10, including processors 16 and hard disk drives 20, in the event of a failure of any power supply 22. Exact redundancy requirements are policy decisions determined by each user. In this embodiment, the redundancy requirement is a n+1 redundancy requirement which requires enough power supplies to operate n+1 processors 16 when only n processors 16 are actually operating. For instance, if processors 16a and 16b are operating, power supplies 22 would need to provide enough power to power processors 16a, 16b, and 16c in order to meet n+1 redundancy requirements.

In this embodiment, processor 16a and power supplies 22a and 22b are initially operational with power supply 22b satisfying the redundancy requirement. For simplicity purposes, overhead power requirements for such components as motherboard 18, bus power, and cooling fans are not considered but may be handled by an additional power supply that only provides fixed system overhead power and does not participate in power supply sequencing. In addition, alternative embodiments may include one or more fixed and variable overhead factors and power supply sequencing may consider power efficiency curves for each power supply rather than the simple peak efficiency listed in column 46.

Because of changes in the demands on server 12, resource management engine 14 signals to power management engine 13 that it needs to power up processor 16b. Before resource management engine 14 powers up processor 16b, power management engine 13 calculates what the inrush demand and supply levels and the steady state demand and supply levels will be and makes sure those values fall within the redundancy and efficiency requirements. When processor 16b becomes operational, the inrush demand required by processors 16a and 16b is 17 A (demand for processors 16a and 16b=5 A+12 A=17 A) and the steady state demand required by processors 16a and 16b is 10 A (demand for processors 16a and 16b=5 A+5 A=10 A). Inrush supply provided by power supplies 22a and 22b is 36 A (supply for power supplies 22a and 22b is 18 A+18 A=36 A) and steady state current provided by power supplies 22a and 22b is 16 A (supply for power supplies 22a and 22b is 8 A+8 A=16 A). Power management engine 13 calculates the inrush and steady state values by using the values in processor demand table 36 and power supply table 34. Processors 16a and 16b inrush demand is calculated by adding the steady state current requirement of processor 16a from column 52 (since it is already operational when processor 16b is brought online) with the inrush current requirement for processor 16b from column 50. Power management engine 13 calculates the inrush and steady state values for power supplies 22a and 22b by adding the inrush current values of column 40 for power supplies 22a and 22b to get the inrush current value and adding the steady state current values of column 42 for power supplies 22a and 22b to get the steady state current value.

Power supplies 22a and 22b are adequate to meet inrush, steady-state, and redundancy and efficiency requirements for bringing online processor 16b. In addition, power supplies 22a and 22b operate at 5 A, not far from the peak efficiency of 6 A, assuming that the steady state loads of processors 16a and 16b may be split equally across power supplies 22a and 22b. Traditional servers typically would have all four power supplies 22 and processors 16a, 16b, 16c, and 16d operating regardless of the demand on server 12, with each power supply 22 sharing a load of 2.5 A, far off the peak efficiency of 6 A for power supplies 22. This wastes power in the form of heat, which must be extracted from server 12 and replaced with cool air, which wastes further power in the cooling system. Since no additional power supplies 22 were required to bring up processor 16b, processor 16 starts immediately.

As demand increases, resource management engine 14 determines that the demand on server 12 requires it to power up processor 16c in addition to processors 16a and 16b. With processor 16c becoming operational, power management engine 13 calculates the inrush demand for processors 16a, 16b, and 16c as 22 A (inrush demand for processors 16a, 16b, and 16c is 5 A+5 A+12 A=22 A) and the steady state current requirement for processors 16a, 16b, and 16c as 15 A (steady state demand for processors 16a, 16b, and 16c is 5 A+5 A+5 A=15 A). Since no new power supplies 22 have been brought online, the inrush supply provided by power supplies 22a and 22b remains as 36 A and the steady state current provided by power supplies 22a and 22b remains 16 A. Power supplies 22a and 22b are adequate to meet inrush and steady-state requirements but not n+1 redundancy requirements. Processors 16a, 16b, and 16c require 15 A of steady power and power supplies 22a and 22b provide 16 A of steady state power. Although that is enough for operation, 16 A is not enough to satisfy n+1 redundancy requirements, which would be 20 A of steady state current. Therefore, power management engine 13 instructs power supply 22c to power up. After waiting the response time of 2.5 s for power supply 22c to settle, resource management engine 14 powers up processor 16c.

When power supply 22c powers up, power management engine 13 monitors the inrush current on power supply 22c because, generally, if a power supply is to fail, it will fail during start up when the inrush current stresses the power supply. If power supply 22c fails during startup, power management engine 13 may move power supply 22c to a servicing pool and power supply 22d will be started up in the place of power supply 22c. Since processor 16c is not brought online until power management engine 13 successfully brings power supply 22c online, there is no undue demand on currently operating power supplies 22a and 22b to supply the required load and thus, little likelihood for failure of one of the existing power supplies 22a or 22b. When power supply 22c successfully comes online, power management engine 13 continues to monitor inrush and steady state information for out of bound conditions that would necessitate retiring a power supply 22 to a servicing pool. Such out of bounds conditions may be determined from boundary conditions stored in power supply table 34, from computations derived from supply data, or a smart power supply that provides its own data and self-monitoring issuing an alert on its own health status.

When power management engine 13 successfully brings power supply 22c online, inrush supply provided by power supplies 22a, 22b, and 22c is 54 A (supply for power supplies 22a, 22b, and 22c is 18 A+18 A+18 A=54 A) and the steady state current provided by power supplies 22a, 22b, and 22c is 24 A (supply for power supplies 22a, 22b, and 22c is 8 A+8 A+8 A=24 A). Processor demand inrush remains at 22 A and processor demand steady state remains at 15 A as calculated above. Power supplies 22a, 22b, and 22c are now adequate to meet inrush, steady-state, and n+1 redundancy requirements for processors 16a, 16b, and 16c.

In the embodiment described above, the process may continue as described above by adding additional processors 16 or removing processors 16 from operation. Just as power supplies 22 are brought online as more processors 16 are brought online, power management engine 13 may also remove power supplies 22 from operation when resource management engine 14 removes processors 16 from operation.

Alternative embodiments may, as a further goal, distribute the time each power supply 22 is used to maximize uptime, in which case, a log of the time each power supply 22 is used is recorded and the log is used in determining which offline power supply 22 is to be brought online. Additional factors may be incorporated, such as relative age of supplies, efficiencies of each power supply 22, and temperature and cooling requirements. In addition, use of asymmetrical power supplies 22 can help optimize efficiency and reduce power consumption by providing different selection points for finer grain control without the expense and complexity of many small power supplies.

In addition to adjusting to the current demand on server 12, system 10 also forecasts or predicts the demand on server 12 based on historical data allowing server 12 to adjust in advance to meet future processing and power demands. Resource management engine 14 stores in dynamic tables 26 historical data regarding previous demands on server 12 as well as knowledge of power grid performance from a power distribution system. Using this information, resource management engine predicts what the demand on server 12 will be for a given time period. Predicting demand far enough in advance allows load-sharing reconfigurations across processors 16 and power supplies 22.

For instance, assume that server 12 provides functionality for a website providing online stock trading. By examining the historical data in dynamic tables 26, resource management engine 14 determines that there is a spike in demand one hour before the New York stock market closes every day that requires all eight processors 16. To account for this spike in demand, prior to one hour before the stock market closes, resource management engine 14 may bring online all eight processors 16 so that server 12 meets the demand without any lag in performance. When resource management engine 14 brings online all eight processors 16, power management engine 13 will bring online the necessary number of power supplies 22 to provide inrush and steady state current requirements and still satisfy redundancy requirements. Therefore, power consumption is reduced because all four power supplies 22 provide power to processors 16 for one hour of the day instead of all day long. Without being able to scale processors 16 and sequence power supplies 22, server 12 would have to have all four power supplies 22 providing power to all eight processors 16 all day just to meet the demand for the last hour of the day.

Resource management engine 14 also predicts demand levels for special events such as sporting events or holidays or just typical day of the week demand. The predictive analysis permits strategically preparing for higher demands by changing processors 16 and power supplies 22 in advance for optimized access. Another benefit of predictive analysis is that maintenance and downtime work can be scheduled around predicted high demand times.

Predictive analysis also allows server 12 to dynamically adjust to national or global phenomena or events and still reduce and conserve power consumption. Resource management engine 14 uses predictive power demand estimates based upon power demands of geographically dispersed data centers in different time zones that experience similar demands earlier in the day.

For example, assume there are huge losses on the Nikkei in Japan. As this news began to spread to Europe and the United States, respective stock markets react and there is high activity and high demand on any websites offering online stock trading. But predictive analysis can efficiently handle this situation. As news travels around the globe and as each country's stock market opens for trading, there will be huge demands made on servers offering online stock trading. For instance, the London market would open before the New York market, so servers serving the London market would need to be scaled to handle the large demand when the London market opens. Later in the day as the New York market opens, servers serving the New York market would need to be scaled to handle the huge demand and this can be done by examining the demand on the London market and predicting what the demand will be in New York. One hour later when the Chicago markets opens, the same scaling would need to occur using the previous time zone demand as an estimate until all the markets have had time to react to the initial shock in Japan. Predictive analysis on a global scale applies to any global event that affects other parts of the world.

Another advantage of system 10 is that it allows for a desired power threshold to be maintained in server 12. The power threshold is achieved by allowing the response time of server 12 to vary between acceptable limits in order to minimize power consumption. Instead of just bringing processors 16 online and offline as fast as possible, resource management engine 14 may have a range of targeted response times for how quickly it brings online and offline processors 16. In addition, resource management engine 14 follows set parameters on whether to power off a processor 16 or reduce it to a lower power state. As demand rises, additional processors 16 are brought online to satisfy the demand. As demand drops, resource management engine 14 powers down processors 16 to lower power states or takes them offline. When power limits are achieved, processors 16 are re-balanced relative to their processing efficiency for such factors as MHz/watt or tpmC/watt and may include their relative power supply efficiencies. As demands rise, the strategy attempts to maximize available processing power while limiting the increase in response time. When demand drops, less efficient processors 16 could be brought online to maximize tpmC/sec.

Figure 3:
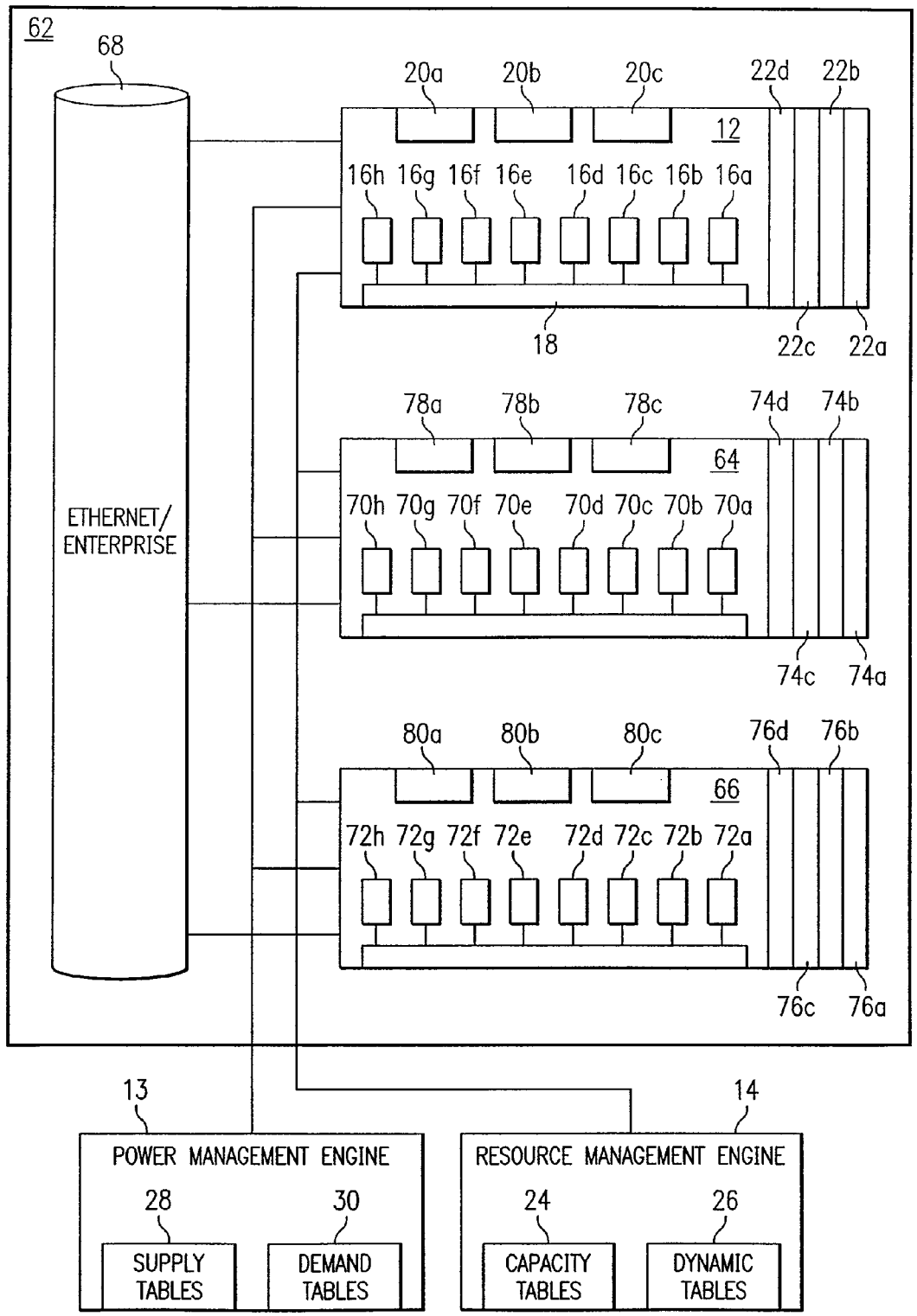
FIG. 3 depicts a block diagram of a server rack system employing strategic power supply sequencing.

Referring to FIG. 3, a block diagram of a server rack system employing strategic power supply sequencing described above is shown. System 60 includes server rack 62 containing servers 12, 64, and 66. In alternative embodiments, system 60 may contain more than three or less than three servers in the server rack. Resource management engine 14 is associated with servers 12, 64, and 66 and provides power reduction and conservation features to servers 12, 64, and 66. Power management engine 13 is associated with servers 12, 64, and 66 and provides strategic power supply sequencing and power optimization features to servers 12, 64, and 66. Servers 12, 64, and 66 communicate with each other, resource management engine 14, and power management engine 13 through enterprise channel 68 which may be an Ethernet connection or any other appropriate communication network.

Server 12 is the same server as described in FIG. 1. Servers 64 and 66 are similar to server 12 in that each one is an 8-way server having eight processors 70 and 72, four power supplies 74 and 76, and three hard disk drives 78 and 80. Power management engine 13 and resource management engine 14 are the same as described in FIG. 1 except that they control servers 12, 64, and 66, their respective processors 16, 70, and 72, and their respective power supplies 22, 74, and 76 to achieve power optimization and conservation.

Capacity tables 24 store processor and power supply information for all three servers 12, 64, and 66 while dynamic tables 26 store historical data for previous demands on servers 12, 64, and 66. Supply tables 28 store power supply side information for all three servers 12, 64, and 66 while demand tables 30 store processor demand side information for all three servers 12, 64, and 66. As with system 10, the information stored in capacity tables 24, dynamic tables 26, supply tables 28, and demand tables 30 may be stored respectively in power management engine 13 and resource management engine 14, spread out across hard disk drives 20, 78, and 80, or in both locations. Storing information in servers 12, 64, and 66 or in both locations allows for redundancy and continued operation if there is a malfunction with power management engine 13 or resource management engine 14.

Resource management engine 14 controls servers 12, 64, and 66 just as it controls server 12 in FIG. 1. System 60 allows for an enterprise wide power reduction and conservation strategy. Even though servers 12, 64, and 66 are three separate computing devices, resource management engine 14 controls them as if they are one computing device and they operate as if they are one computing device. Resource management engine 14 preferably has knowledge of relevant characteristics of all components in servers 12, 64, and 66 which allows resource management engine 14 to control servers 12, 64, and 66 as one computing device.

Resource management engine 14 can bring online or offline entire servers 12, 64, or 66 or bring online, offline, or power to a lower power state any of processors 16, 70, or 72. For instance, server 12 can always be turned on as the base server. As demand increases and all eight processors 16 within server 12 cannot meet the demand, resource management engine 14 may turn on server 64 and processors 70 to satisfy the demand requirements. When demand is too great for all eight processors 16 and all eight processor 70, resource management engine 14 may turn on server 66 and processors 72 to satisfy the demand. But all the processors in a certain server do not need to be utilized before a new server is brought online. For example, assume server 12 and processors 16a, 16b, and 16c are turned on. An increase in demand requires additional processors to satisfy the demand. Instead of bringing up additional processors 16, resource management engine 14 can bring up processors 70a and 70b in server 64 to satisfy the demand. The order in which the processors and servers are brought online and offline is determined by the characteristics of the processors and servers including power supply sequencing strategies developed by power management engine 13 and user inputs regarding a hierarchy between the processors and servers into resource management engine 14.

Power management engine 13 controls power supplies 22, 74, and 76 just as it controls power supplies 22 in FIG. 1. System 60 allows for enterprise wide strategic power supply sequencing. Even though power supplies 22, 74, and 76 are in three separate servers 12, 64, and 66, power management engine 13 controls power supplies 22, 74, and 76 as if they are in one computing device and they operate as if they are in one computing device. Power management engine 13 preferably has knowledge of relevant power characteristics for all components in servers 12, 64, and 66 which allows power management engine 13 to control power supplies 22, 74, and 76 as though they are in one computing device.

Power management engine 13 operates to allow any of power supplies 22, 74, and 76 to provide power to processors 16, 70, and 72 regardless of whether the power supplies and processor are in the same server. For instance, power management engine 13 can decide to power processors 16a, 16b, 70a, and 72a using power supplies 22a, 22b, 22c, and 22d. The fact that power supplies in one server can provide power to processors in another server allows power management engine 13 to provide power supply sequencing on an enterprise level across multiple computing devices. In addition, redundancy features are affected in that if power supplies 74a, 74b, 74c, and 74d fail, power supplies 22 and 76 may be used to power processors 70.

As with system 10 operating alone in FIG. 1, system 60 also exhibits predictive analysis, dynamic adjustment to global conditions, and establishing power thresholds as explained above. In addition, enterprise wide power supply sequencing strategies can be extended further to a plurality of server racks in a network where power supplies in one server rack can provide power to processors in a different server rack on the same server rack network.

Figure 4:
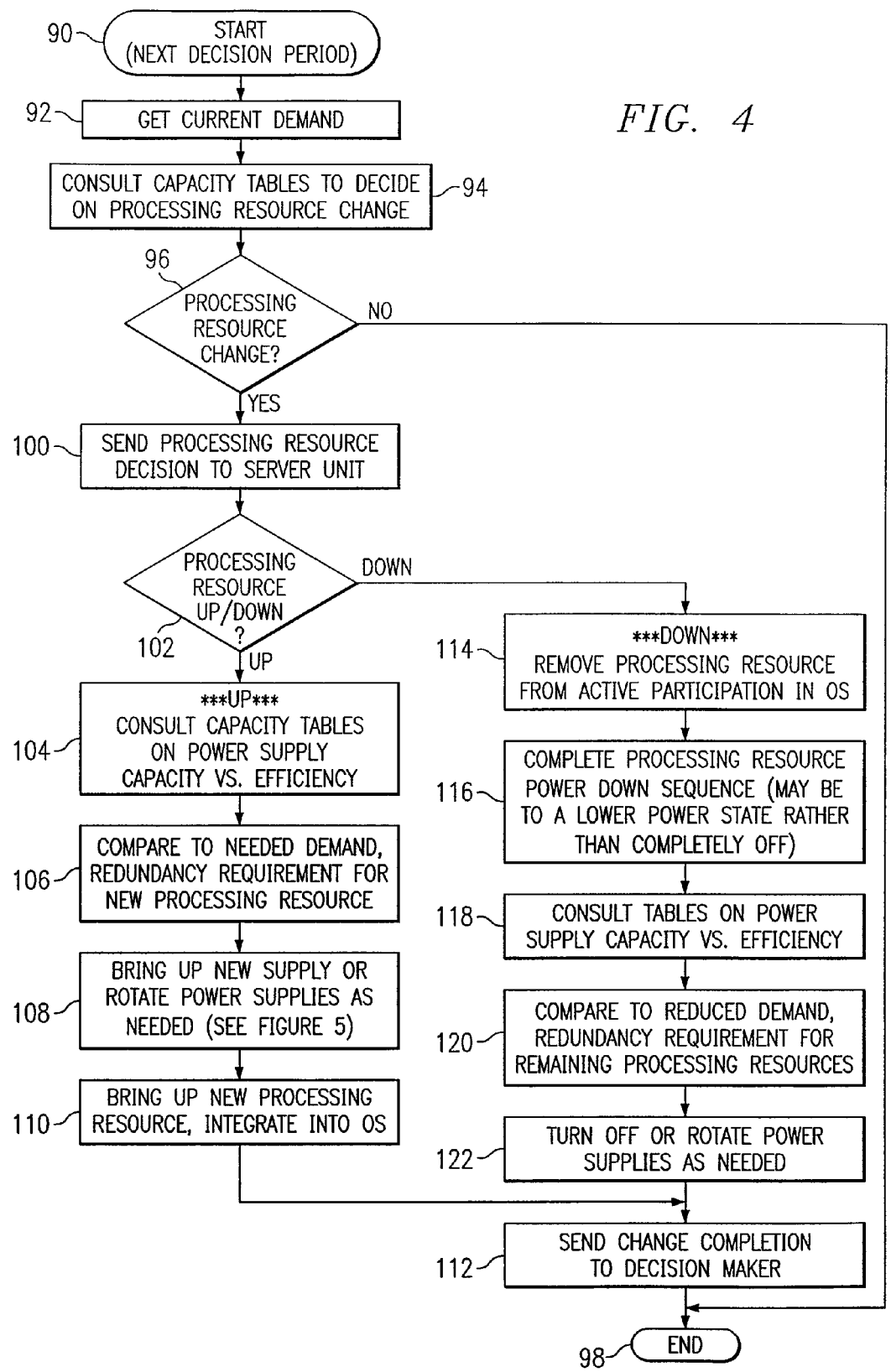
FIG. 4 illustrates a flow diagram of a method for strategic power supply sequencing in a computer system.

FIG. 4 shows one example of a flow diagram of a method for strategic power sequencing in a computer system. For discussion purposes, FIG. 4 refers to system 10 but equally applies to system 60 or any other appropriate multi-processor and multiple power supply computer system.

The process begins in step 90 when the next decision period begins. In step 92, resource management engine 14 analyzes server 12 to get the current power and processing demands on server 12. Resource management engine 14 then examines capacity tables 24 to decide if a processor change is required to satisfy the current demand in step 94. Resource management engine 14 looks at processor 16 characteristics in capacity tables 24 and compares those values with the current demand. From the comparison in step 94, resource management engine 14 decides if a processor change is needed to meet the current demand in step 96. If no processor change is required, the process ends in step 98. If a processor change is required, the process continues on to step 100.

In step 100, resource management engine 14 signals to server 12 that a processor change is imminent. Using the current demand, resource management engine 14 determines if the current demand requires bringing online additional processors 16 or bringing offline processors 16 in step 102. If the current demand requires bringing online additional processors 16, the process continues to step 104 while if the current demand requires bringing offline processors 16, the process continues on to step 114.

If the decision is to bring online additional processors 16, in step 104 resource management engine 14 consults capacity tables 24 to examine the power supply requirements of the currently operating processors 16 and the efficiency ratings of processors 16 and power supplies 22 to ensure that bringing online additional processors 16 will not cause for server 12 to operate inefficiently. In step 106, resource management engine 14 compares the current demand requirement with the user decided processor and power supply redundancy requirements and any specific requirements for new processor 16 about to brought online. In step 108, power management engine 13 examines supply tables 28 and demand tables 30 to determine if additional power supplies 22 are needed to power the additional processor 16 and then brings online additional power supplies 22. The process for power management engine 13 bringing online additional power supplies 22 is explained in greater detail in FIG. 5. In step 110, resource management engine 14 brings up the additional processors 16 needed to meet the current demand and the additional processors 16 are integrated into the operating system for server 12. In step 112, the processor change is complete and a completion decision is sent to server 12, resource management engine 14, and power management engine 13 and the process ends in step 98.

If in step 102 the decision is to reduce the number of processors 16 in order to meet the current demand, in step 114 resource management engine 14 removes the no longer needed processor 16 from active participation in the operating system of server 12. Once processor 16 is removed from active participation, in step 116 resource management engine 14 must decide whether to take processor 16 offline or power it to a lower power state. The decision on whether to take offline or to a lower power state depends on the current demand level, predicted future demand levels, power threshold levels, processor 16 and power supply 22 characteristics, and power management strategies. If resource management engine 14 predicts that the demand requirement will increase again in a short time period, processor 16 may be powered to a lower power state instead of completely taken offline so that when the additional processing power is needed to meet the current demand, processor 16 will only have to go from a lower power state to online instead of from offline to online. This will allow for power conservation and also decreases startup time for the processor.

In step 118, power management engine 13 consults supply tables 28 to determine the capacities and efficiencies of the currently operating power supplies 22. In step 120, power management engine 13 consults demand tables 30 and compares the reduced processor 16 inrush and steady state current requirements with the inrush and steady state current provided by the currently operating power supplies 22. In order to sequence power supply operation and optimize power consumption, power management engine 13 turns or rotates power supplies 22 in step 122. The process for power management engine 13 to reduce the number of power supplies 22 operating is detailed in FIG. 6. In step 112, the processor change and power supply change is complete and a completion decision is sent to server 12, resource management engine 14, and power management engine 13 and the process ends in step 98.

The process in FIG. 4 may repeat at selected intervals such as every five or ten minutes so that resource management engine 14 constantly determines the current demand so that resource management engine 14 adjusts system 10 to the current demand and power management engine 13 adjusts power supplies 22 so that power consumption is reduced. Resource management engine 14 may adjust the time period of the intervals based on historical data and/or the level of current demand on server 12.

Figure 5:
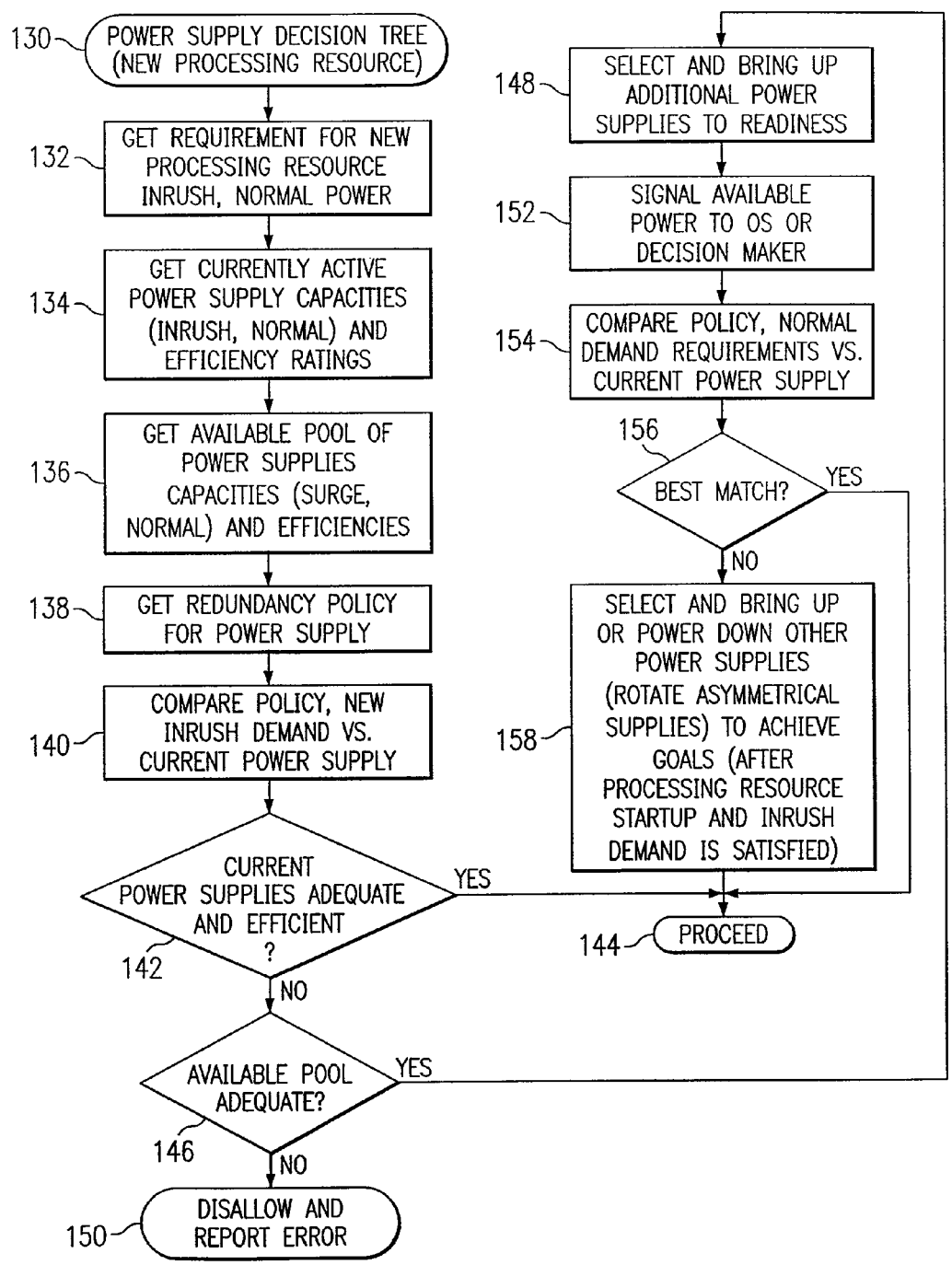
FIG. 5 depicts a flow diagram of a method for powering up additional power supplies.

FIG. 5 depicts a flow diagram for powering up additional power supplies as described above in step 108 in FIG. 4. The process begins at step 130 when resource management engine 14 decides to bring online an additional processor 16.

In step 132, power management engine 13 consults demand tables 30 to get the inrush and steady state current requirements for additional processor 16. Power management engine 13 then consults supply tables 28 to get the inrush requirements, steady state requirements, and efficiency ratings for currently active power supplies 22 in step 134. In step 136, power management engine 13 again consults supply tables 28 for the inrush requirements, steady state requirements, and efficiency ratings for all available power supplies 22. Power management engine 13 gets the redundancy policy which is user determined and may be stored in supply tables 28 in step 138.

In step 140, power management engine 13 compares the redundancy policy, the inrush and steady state demand requirements for processors 16, and the current supply side inrush and steady state requirements provided by the currently active power supplies 22. In step 142, power management engine 13 determines if the current power supply configuration is adequate and efficient for the new processor configuration. Adequacy is determined by making sure power supplies 22 meet the required inrush, steady state and redundancy requirements. Efficiency is determined by making sure that power supplies 22 are operating near their peak efficiencies. If the current power supplies 22 are adequate and efficient, then the process ends in step 144 and no new power supplies 22 are brought online. If the current power supplies 22 are not adequate or efficient, then in step 146 power management engine 13 determines if the available pool of power supplies 22 is sufficient to meet the current processor power requirements. If the available pool of power supplies 22 is adequate to meet the processor requirements, the process continues to step 148. If the available pool of power supplies 22 is not adequate to meet the processor requirements, then in step 150 the processor change is disallowed and an error is reported to the system administrator.

If the available pool of power supplies is adequate, then in step 148 power management engine 13 selects and brings up additional power supplies 22 to readiness. Power management engine 13 then signals to the operating system that there is additional power to bring up additional processors 16 in step 152. In step 154, power management engine 13 compares the power optimization policy, redundancy requirements, demand inrush and steady state requirements to the power supply inrush and steady state current requirements and determines if the power supply 22 is the best match in step 156. Power management engine 13 determines a best match by seeing if power supplies 22 are operating near peak efficiency with little power wasted. If it is a best match, then the process ends in step 144. If not a best match, the process continues onto step 158 where power management engine 13 brings online and offline and rotates different power supplies 22 until the power supply sequencing and power optimization goals are achieved and the process proceeds back to FIG. 4 in step 144.

Figure 6:
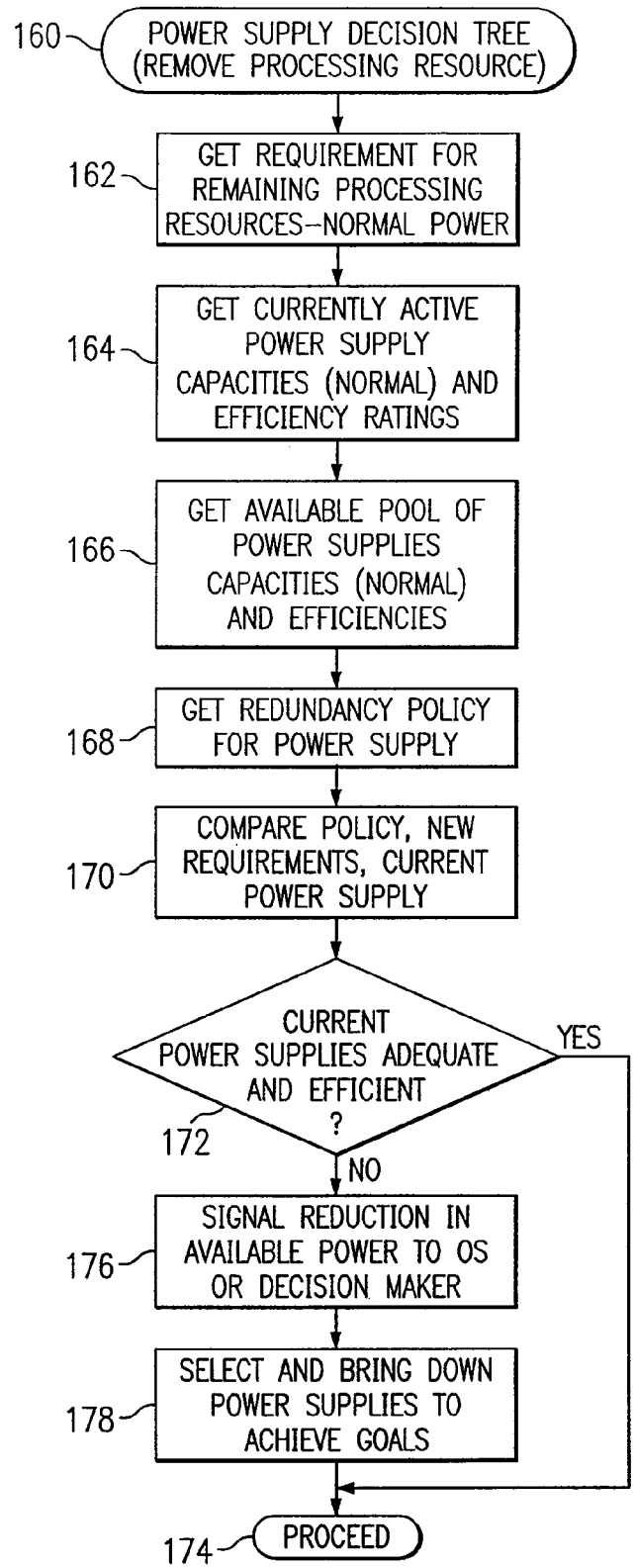
FIG. 6 illustrates a flow diagram of a method for powering down currently operating power supplies.

FIG. 6 illustrates a flow diagram for powering down currently operating power supplies as described above in steps 118, 120, and 122 of FIG. 4. The process begins in step 160 when resource management engine 14 decides to power down a currently operating processor 16.

In step 162, power management engine 13 examines demand tables 30 to get the inrush and steady state current requirements for the remaining active processors 16. Power management engine 13 then consults supply tables 28 to get the inrush requirements, steady state requirements, and efficiency ratings for currently active power supplies 22 in step 164. In step 166, power management engine 13 again consults supply tables 28 for the inrush requirements, steady state requirements, and efficiency ratings for all available power supplies 22. Power management engine 13 gets the redundancy policy which is user determined and may be stored in supply tables 28 in step 168.

Power management engine 13 compares the redundancy requirements and power optimization requirements with the inrush and steady state demand requirements for the remaining active processors 16 with the inrush and steady state supply requirements for the currently operating power supplies 22 in step 170. In step 172, power management engine 13 determines if the currently active power supplies 22 are adequate and efficiently satisfy the demand requirements of processors 16. Adequacy is determined by the making sure power supplies 22 provide enough current to operate processors 16 while efficiency involves making sure power supplies 22 are operating near their peak efficiency. If the current power supply configuration is adequate and efficient, the process continues to step 174 and proceeds back to FIG. 4.

If the current power supply configuration is not adequate or efficient in step 172, then the process continues on to step 176 where power management engine 13 signals a reduction in available power to the operating system. In step 178, power management engine 13 selects which power supplies 22 to bring offline so at to optimize power consumption and yet still meet redundancy requirements and provide enough power to processors 16. The process then continues on to step 174 where the process returns to FIG. 4.

In addition to bringing power supplies 22 online and offline in FIGS. 5 and 6, power management engine 13 also rotates which power supplies are operational to save on power supply life and to take advantage of new power supplies which may operate more efficiently than older power supplies.

Although the disclosed embodiments have been described in detail, it should be understood that various changes, substitutions and alterations can be made to the embodiments without departing from their spirit and scope.

What is claimed is:

1. A method for power management in a computer system including multiple processors and multiple power supplies operable to supply power to the multiple processors, the method comprising:
receiving a notification of a pending change in an operating status of one or more of the multiple processors at a power management engine; and
in response to the received notification:
accessing, by the power management engine, a dynamic table listing historical power-related data regarding the one or more of the multiple processors having the pending change in the operating status;
determining an adjustment of the one or more of the multiple power supplies by the power management engine based at least on the accessed historical power-related data regarding the one or more of the multiple processors; and
adjusting one or more of the multiple power supplies by the power management engine before the pending change in the operating status of the one or more of the multiple processors is implemented.

2. A method according to claim 1, further comprising:
based on processing demand, determining an appropriate change in the operating status of the one or more of the multiple processors by a resource management engine; and
wherein the received notification is based on the determined appropriate change in the operating status of the one or more of the multiple processors.

3. A method according to claim 1, further comprising:
in response to the received notification, accessing stored data regarding the one or more of the multiple power supplies by the power management engine; and
determining an adjustment of the one or more of the multiple power supplies by the power management engine based at least on the accessed stored data regarding the one or more of the multiple power supplies.

4. A method according to claim 1, wherein adjusting the one or more of the multiple power supplies by the power management engine comprises powering up the one or more of the multiple power supplies.

5. A method according to claim 1, wherein adjusting the one or more of the multiple power supplies by the power management engine comprises powering down the one or more of the multiple power supplies.

6. A method according to claim 1, wherein the computer system comprises multiple servers.

7. A method according to claim 1, further comprising:
in response to the received notification, determining additional power demands associated with the pending change in the operating status of the one or more of the multiple processors by the power management engine; and
determining an adjustment of the one or more of the multiple power supplies by the power management engine based at least on the determined additional power demands.

8. A method according to claim 1, further comprising:
in response to the received notification, determining an inrush power demand associated with the pending change in the operating status of the one or more of the multiple processors by the power management engine; and
determining an adjustment of the one or more of the multiple power supplies by the power management engine based at least on the determined inrush power demand.

9. A method according to claim 1, further comprising periodically adjusting the multiple power supplies by the power management engine by rotating which of the multiple power supplies provide power to the multiple processors.

10. A method for power management in a computer system including multiple processors and multiple power supplies operable to supply power to the multiple processors, the method comprising:
receiving a notification of a change in an operating status of one or more of the multiple processors at a power management engine;
accessing a dynamic table listing historical power-related data regarding the one or more of the multiple processors by the power management engine, the historical power-related data comprises at least one of inrush current data and steady state current data regarding the one or more of the multiple processors; and
adjusting one or more of the multiple power supplies by the power management engine based at least on the accessed historical power-related data regarding the one or more of the multiple processors.

11. A method according to claim 10, wherein the computer system comprises multiple servers.

12. A method according to claim 10, wherein:
the received notification comprises a notification of a pending change in the operating status of the one or more of the multiple processors; and
adjusting the one or more of the multiple power supplies by the power management engine comprises adjusting one or more of the multiple power supplies before the pending change in the operating status of the one or more of the multiple processors is implemented.

13. A method according to claim 10, further comprising:
accessing stored data regarding the one or more of the multiple power supplies by the power management engine; and
adjusting the one or more of the multiple power supplies by the power management engine based at least on the accessed historical power-related data regarding the one or more of the multiple processors and the accessed stored data regarding the one or more of the multiple power supplies.

14. A method for power management in a computer system including multiple processors and multiple power supplies operable to supply power to the multiple processors, the method comprising:
receiving a notification of a pending change in an operating status of one or more of the multiple processors at a power management engine;
accessing a dynamic table listing historical stored data regarding one or more of the multiple power supplies by the power management engine; and
in response to the received notification, adjusting at least one of the multiple power supplies by the power management engine based at least on the accessed historical stored data regarding the one or more of the multiple power supplies.

15. A method according to claim 14, wherein:
the historical stored data regarding the one or more of the multiple power supplies comprises at least one of inrush current delivery data, steady state current capacity data, and power efficiency data regarding the one or more of the multiple power supplies.

16. A method according to claim 14, wherein:
the historical stored data regarding the one or more of the multiple power supplies comprises at least one of load data, peak efficiency current data, and power supply response time data regarding the one or more of the multiple power supplies.

17. A method according to claim 14, wherein:
adjusting the at least one of the multiple power supplies by the power management engine comprises adjusting the at least one of the multiple power supplies before the pending change in the operating status of the one or more of the multiple processors is implemented.

18. A method according to claim 14, further comprising:
accessing stored power-related data regarding the one or more of the multiple processors; and
adjusting the at least one of the multiple power supplies by the power management engine based at least on the accessed historical stored data regarding the one or more of the multiple power supplies and the accessed power-related data regarding the one or more of the multiple processors.

* * * * *